United States Patent [19]

Groteke et al.

[11] Patent Number: 4,572,486
[45] Date of Patent: * Feb. 25, 1986

[54] MOLTEN METAL FILTERING VESSEL WITH INTERNAL FILTER

[75] Inventors: Daniel E. Groteke, Cincinnati, Ohio; Avery L. Kearney, Valparaiso, Ind.

[73] Assignee: Metcast Associates, Inc., Cincinnati, Ohio

[*] Notice: The portion of the term of this patent subsequent to Apr. 24, 2001 has been disclaimed.

[21] Appl. No.: 602,507

[22] Filed: Apr. 20, 1984

Related U.S. Application Data

[63] Continuation-in-part of Ser. No. 398,406, Jul. 14, 1982, Pat. No. 4,444,377.

[51] Int. Cl.$^4$ .............................................. C21C 7/04
[52] U.S. Cl. .................................... 266/229; 266/275; 222/591
[58] Field of Search .................. 266/227, 229, 275; 222/591, 603, 604, 605, 629

[56] References Cited

U.S. PATENT DOCUMENTS

| | | | |
|---|---|---|---|
| 361,352 | 4/1887 | Donovan | 222/605 |
| 4,394,271 | 7/1983 | Groteke | 266/227 |
| 4,444,377 | 4/1984 | Groteke et al. | 266/227 |

*Primary Examiner*—L. Dewayne Rutledge
*Assistant Examiner*—Robert L. McDowell
*Attorney, Agent, or Firm*—Janine J. Weins; Michael J. Weins

[57] ABSTRACT

The present invention provides an improved filtering vessel for filtering molten metal. The filtering vessel of the present invention is provided with a partition and fitted with a removable filter blade. The partition provides support for the removable filter blade. The removable filter blade contains a filter element. Molten metal is filtered by passing through the filter element contained in the removable filter blade. Molten metal can be made to pass through the filter element by the appropriate application of pressure to the surface of the unfiltered molten metal, by tilting the vessel in such a manner as to cause hydrostatic pressure to force unfiltered molten metal through the filter element, or by removing filtered molten metal with a ladle and thereby causing a differential hydrostatic pressure between the region of the vessel containing filtered molten metal and the region of the vessel containing unfiltered molten metal. During operation molten metal can be intermittently back-flushed through the filter element. Back-flushing molten metal through the filter element extends the life of the filter element, and thereby increases the hours the filtering vessel may be used between changes of the removable filter blade.

13 Claims, 6 Drawing Figures

MOLTEN METAL FILTERING VESSEL WITH INTERNAL FILTER

DESCRIPTION

This application is a continuation-in-part of U.S. application Ser. No. 398,406 filed July 14, 1982 which has issued as U.S. Pat. No. 4,444,377.

FIELD OF INVENTION

The present invention relates to a vessel which is provided with a filter for filtering molten metal, and to the method for using the vessel.

BACKGROUND ART

Molten metal contains impurities which are detrimental to the resulting cast product. These impurities may include oxides of the metal, inclusions introduced by fluxes used during melting, or products formed by interaction of the molten metal with the furnace lining.

Techniques for removing impurities from the molten metal include filtering the molten metal in the holding or melting furnace, and/or placing a gate filter in the mold to filter the molten metal as it enters the mold. If the molten metal is filtered in the holding or melting furnace impurities may be picked up by the molten metal during transfer from the furnace to the vessel, and from the vessel to the mold. If a filter is placed in a mold gate excess superheat may be required, the time to fill the mold may be excessive, and in addition mold gate filtering is costly. Excess superheat can increase gas solubility in the molten metal and will increase the energy costs for the melting and casting operation.

SUMMARY OF INVENTION

The present invention provides an improved filtering vessel for filtering molten metal. Using the filtering vessel of the present invention molten metal can be filtered immediately prior to the molten metal being ladled; or during transfer by the vessel of molten metal to a mold or other appropriate receptacle.

The filtering vessel of the present invention is provided with a partition and in addition is fitted with a removable filter blade. The partition is pervious to molten metal and divides the region of the vessel containing the filtered molten metal from the region of the vessel containing the unfiltered molten metal. In addition the divider provides support for a removable filter blade. The removable filter blade contains a filter element. Molten metal is filtered by passing through the filter element contained in the removable filter blade. Molten metal can be made to pass through the filter element by the appropriate application of pressure to the surface of the unfiltered molten metal, by tilting the vessel in such a manner as to cause hydrostatic pressure to force unfiltered molten metal through the filter element, or by removing filtered molten metal with a ladle and thereby causing a differential hydrostatic pressure between the region of the vessel containing filtered molten metal and the region of the vessel containing unfiltered molten metal.

During operation molten metal can be intermittently back-flushed through the filter element. Back-flushing molten metal through the filter element extends the life of the filter element, and thereby increases the hours of filtering vessel may be used between changes of the removable filter blade.

BEST MODES FOR CARRYING THE INVENTION INTO PRACTICE

Figure 1:
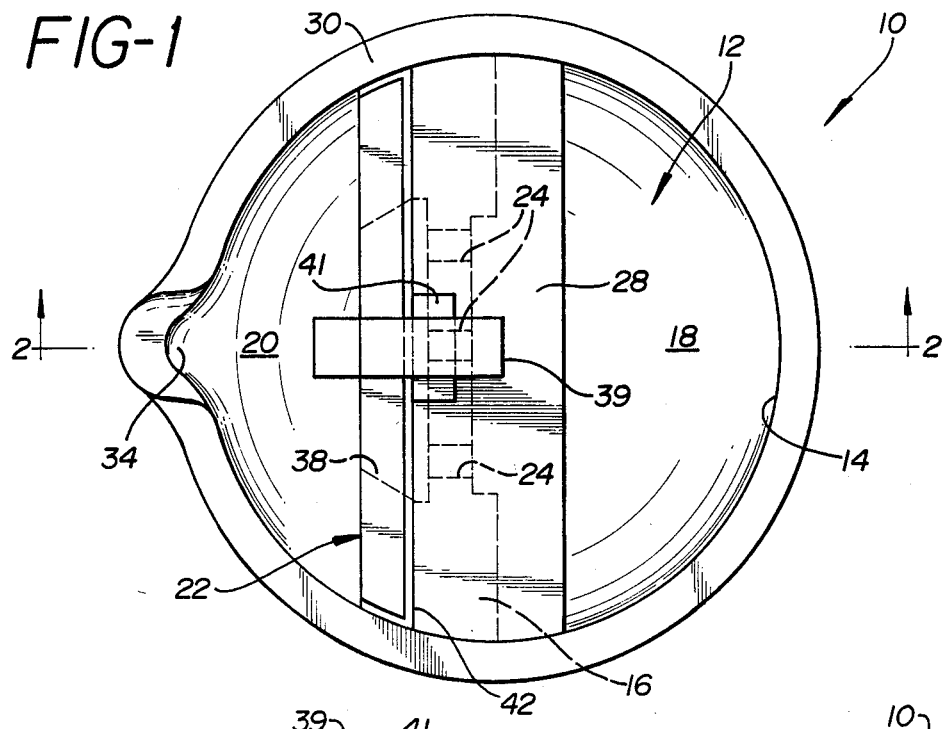
FIG. 1 is a schematic representation of a top view of a molten metal pouring vessel of the present invention.

FIG. 1 shows a top view of a pouring vessel 10 in accordance with one embodiment of the present invention. The pouring vessel 10 has a cavity 12 which is bounded by an interior wall 14. Affixed to the interior wall 14 is a partition 16 which divides the cavity 12 into a first section 18 and a second section 20. Positioned within the second section 20 and adjacent to the partition 16 is a removable filter blade 22.

Figure 2:
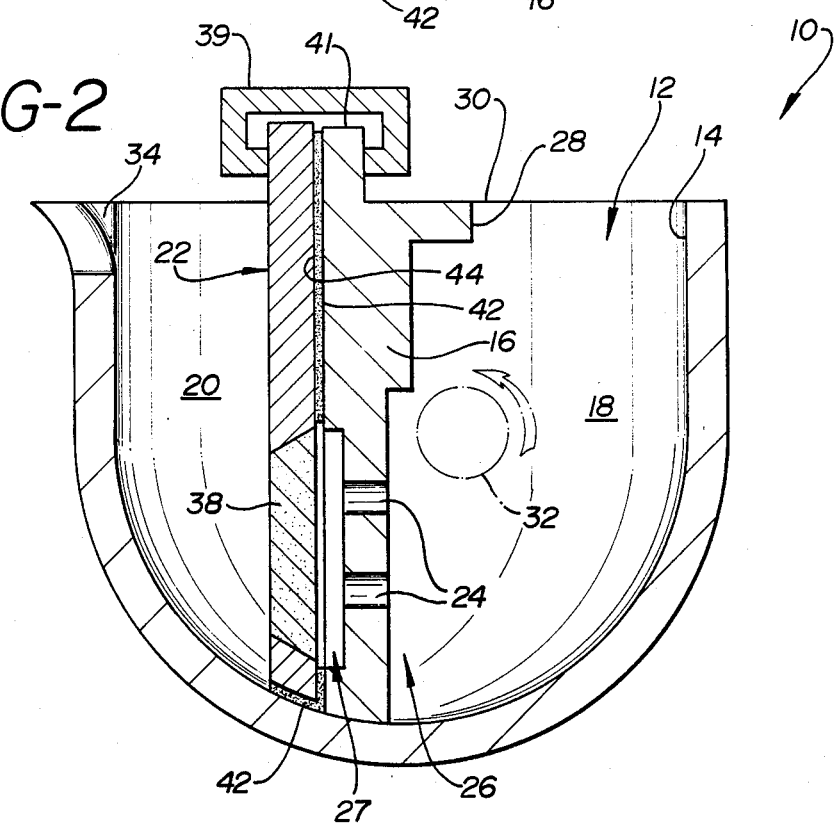
FIG. 2 is a sectional view of the pouring vessel shown in FIG. 1.

FIG. 2 is a cross sectional view of the pouring vessel 10 of FIG. 1. The partition 16 has passages 24 therethrough which allow for communication between the first section 18 and the second section 20. In addition the partition 16 is provided with a first cavity 26 and a second cavity 27 in the vicinity of the passages 24, and with a dam 28 at the rim 30 of the vessel 10. The dam 28 extends over a portion of the first section 18. When the pouring vessel 10 is rotated about an axis 32 in such a manner as to lower the spout 34 so as to allow molten metal to flow from second section 20, the dam 28 in combination with the first cavity 26 allow for a greater angular rotation without molten metal overflowing from the first section 18.

The removable filter blade 22 has an opening 36. When the blade 22 is positioned in the second section 20 of the vessel 10 the opening 36 in the blade 22 communicates with the second cavity 27 in the partition 16. Fitted to the opening 36 in the blade 22 is a filter element 38. When the blade 22 is positioned in the second section 20 the filter element 38 interrupts the path of molten metal flowing from the first section 18 into the second section 20. The blade 22 is contoured so as to be supported by the interior wall 14 and in contact with the partition 16. The blade 22 can be further secured by clamping means such as a C-clamp 39 which clamps the blade 22 to a brace 41 which is attached to the partition 16.

The second cavity 27 extends the amount of the surface of the filter element 38 that is in contact with unfiltered molten metal. Filtered molten metal can be removed from the vessel 10 by rotating the vessel 10 about axis 32 which then allows filtered molten metal to flow from the spout 34. The filtered molten metal in the second section 20 is replenished by molten metal which flows through the passages 24 into the second cavity 27 and then through the filter element 38 into the second section 20.

Figure 3:
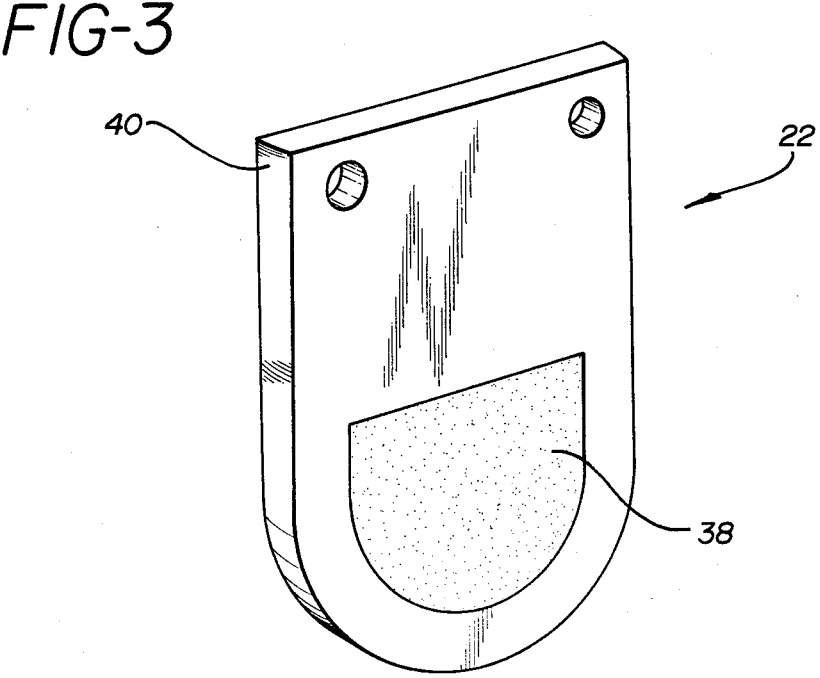
FIG. 3 is a schematic representation of the removable filter blade used in the pouring vessel of FIG. 1.

FIG. 3 shows details of the removable filter blade 22. The peripheral edge 40 of the blade 22 is sculptured so as to have a preformed contour which mates with the interior wall 14 of the vessel 10. Holes can be provided to the blade 22 to assist in removal. Preferably non-wetting a seal 42 is placed between the removable filter blade 22 and the wall 14 of the vessel 10 and the face 44 of the partition 16. Seals such as a seal comprised of three layers, the first layer being a graphite mat impregnated with a polymer, the second layer being a cloth woven of graphite fibers, and the third layer being similar to the first layer, a graphite mat impregnated with a polymer; a seal made from a refractory felt such as (FIBERFRAX) a trademark of the Carborundum Co., Niagra Falls, NY; or a gasket seal in combination with ribs on the mating surface of the paddle can be utilized. The seal 42 assures that molten metal entering the second section 20 of the vessel 10 from the first section 18 passes through the filter element 38, and that the removable filter blade 22 can readily be removed.

Figure 4:
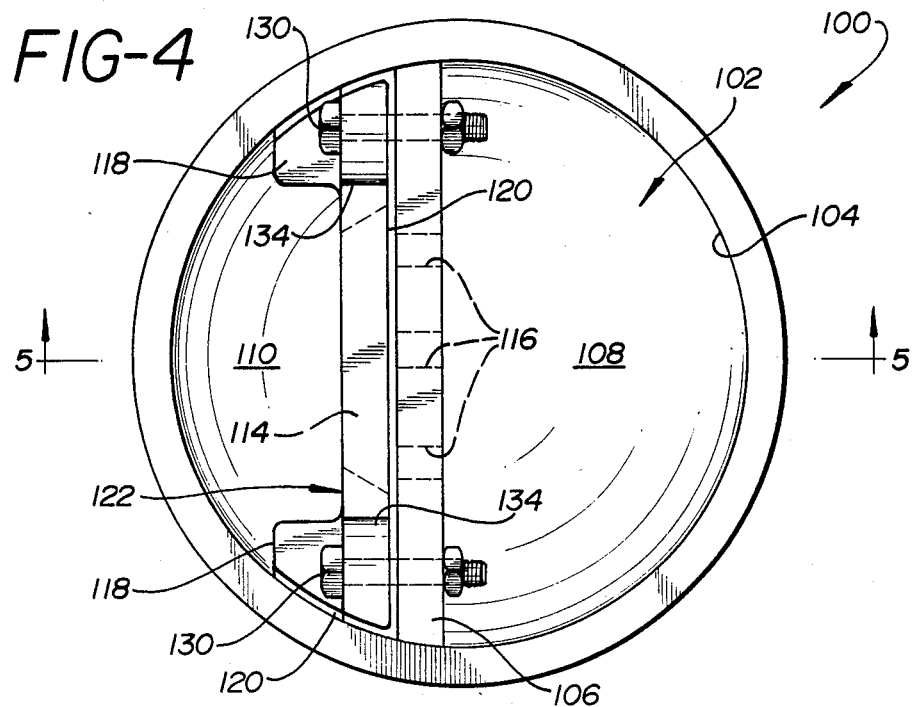
FIG. 4 is a schematic representation of a top view of a vessel of a second embodiment of the present invention.

FIG. 4 is a schematic representation of a top view of a vessel 100 in accordance with a second embodiment of the present invention. The vessel 100 has a cavity 102 which is bounded by an interior wall 104. Affixed to the interior wall 104 is a partition 106 which divides the cavity 102 into a first section 108 and a second section 110. Positioned adjacent to the partition 106 is a removable filter blade 112 which contains a filter element 114.

Figure 5:
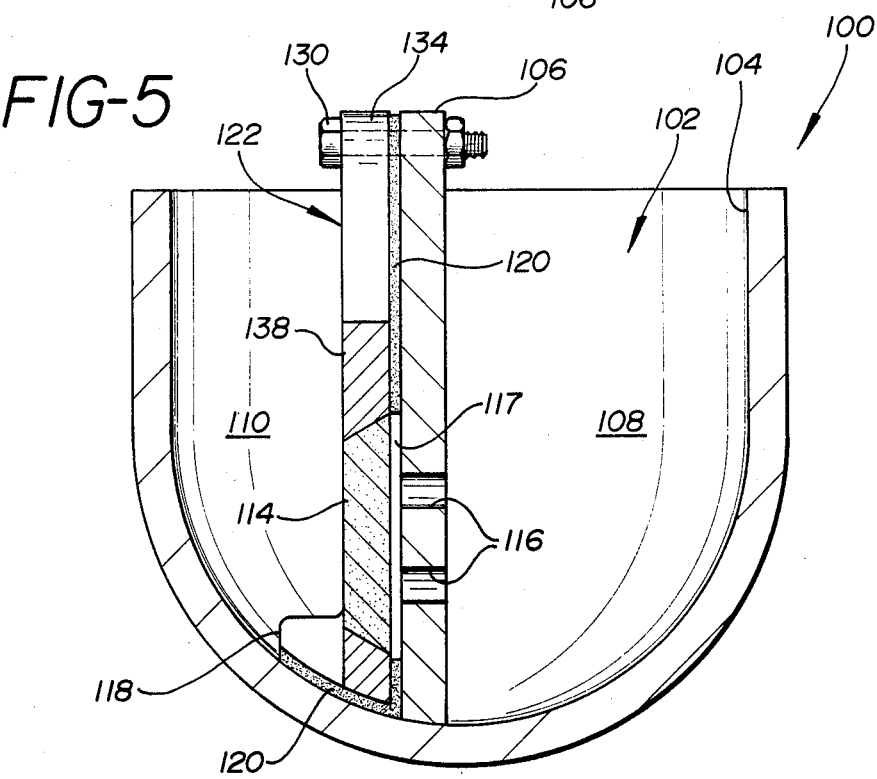
FIG. 5 is a schematic representation of a cross sectional view of the vessel of the present invention shown in FIG. 4.

FIG. 5 is a cross sectional view of the vessel 100 of FIG. 4. The partition 106 has passages 116 therethrough which allow for communication between the first section 108 and the second section 110. Preferably the partition 106 is provided with a cavity 117 in the vicinity of the passages 116 and on the side of the partition 106 adjacent to the removable filter blade 112. The blade 112 is provided with cams 118 which are contoured to mate with the lower portion of the interior wall 104 of the vessel 100. When the blade 112 is placed within the vessel the cams 118 assure that the blade 112 is positioned against the partition 106 and that the filter element 114 communicates with the cavity 117.

Preferably a seal 120 is placed between the blade 112 and the interior wall 104 of the vessel 100, and the face 122 of the partition 106. Seals such as a seal comprised of three layers, the first layer being a graphite mat impregnated with a polymer, the second layer being a cloth woven of graphite fibers, and the third layer being similar to the first layer, a graphite mat impregnated with a polymer; a seal made from a refractory felt such as (FIBERFRAX) a trademark of the Carborundum Co., Niagra Falls, NY; or a gasket seal in combination with ribs on the mating surface of the paddle can be utilized. The seal 120 assures that molten metal entering the second section 110 of the vessel 100 from the first section 108 passes through the filter element 114, and that the removable filter blade 112 can readily be removed. The blade 112 can be further secured by the use of affixing means such as bolts 130 which tie the blade 112 to the partition 106.

When the molten metal is removed from the second section 110 of the vessel 100 filtered molten metal flows through the filter element 114 into the second section 110.

Figure 6:
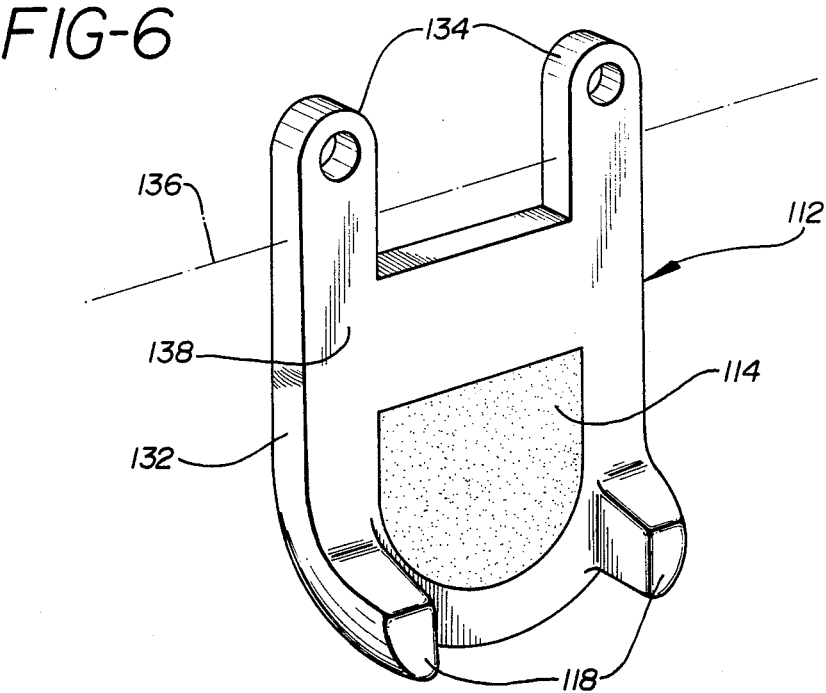
FIG. 6 is a schematic representation showing details of the removable filter blade used in the vessel of the present invention shown in FIG. 4.

FIG. 6 shows details of the removable filter blade 112. The peripheral edge 132 of the blade 112 is sculptured so as to have a preformed contour which mates with the interior wall 104 of the vessel 100. The cams 118 provide additional support and assure that the blade 112 is positioned against the partition 106. The blade 112 is provided with ears 134 which extend above the level of the molten metal bath 136 to such an extent that the blade body 138 is fully submerged in the molten metal bath 136 during operation. Fully submerging the blade body 138 in the molten metal bath 136 during operation minimizes thermal stresses and the associated warping of the blade body 138.

Molten metal can be removed from the second section 110 of the vessel 100 by a ladle not shown. Details of additional methods of causing molten metal to flow from the vessel are described in U.S. application Ser. No. 398,406 filed July 14, 1982 which has issued as U.S. Pat. No. 4,444,377 which is incorporated herein by reference.

While the novel features of this invention have been described in terms of preferred embodiments and particular applications, it will be appreciated that various omissions and substitutions in form and in detail of the apparatus and method may be made by those skilled in the art without departing from the spirit of the invention.

What we claim:

1. A molten metal filtering vessel having an internal wall cavity;
   a partition attaching to said wall separating said vessel into a first section and a second section;
   at least one passage in said partition allowing said first section to communicate with said second section;
   a blade positioned in said second section adjacent to said partition having a preformed contour to mate with said wall and having a passage therethrough;
   said passage of said blade communicating with said passage of said partition; and
   a filter element in said passage of said blade.

2. The vessel of claim 1 further comprising:
   a non-wetting seal between said blade and the wall of said passage.

3. The vessel of claim 1 further comprising cams attached to said blade said cams being so contoured as to mate with said inner wall of said vessel thereby providing additional support to said blade.

4. The vessel of claim 1 further comprising a dam which extends over the upper lip of the vessel.

5. The vessel of claim 1 wherein the blade is removable.

6. The vessel of claim 5 wherein the removable blade is secured by clamping means.

7. The vessel of claim 6 wherein said clamping means is a C-clamp.

8. The vessel of claim 5 wherein the removable blade is provided with holes to assist in removal of the blade.

9. The vessel of claim 5 wherein the blade is provided with ears that extend above the molten metal.

10. The vessel of claim 5 wherein sealing means are used to secure the blade to the partition in the vessel.

11. The vessel of claim 10 wherein the sealing means comprises a three-layer seal, the first layer being a graphite mat impregnated with a polymer, the second layer being a cloth woven of graphite fibers, and the third layer being a graphite mat impregnated with a polymer.

12. The vessel of claim 10 wherein the sealing means is a refractory felt.

13. The vessel of claim 10 wherein the sealing means is a gasket seal in combination with ribs on the mating surface of the blade.

* * * * *